US009748772B2

(12) United States Patent
Bakas et al.

(10) Patent No.: US 9,748,772 B2
(45) Date of Patent: Aug. 29, 2017

(54) METHOD OF CONTROLLING A SOLAR POWER PLANT, A POWER CONVERSION SYSTEM, A DC/AC INVERTER AND A SOLAR POWER PLANT

(71) Applicant: ABB Schweiz AG, Baden (CH)

(72) Inventors: Panagiotis Bakas, Västerås (SE); Sara Ahmed, Cary, NC (US); Michal Lazarczyk, Cracow (PL); Radoslaw Nalepa, Raciborowice (PL); Antonis Marinopoulos, Västerås (SE); Dimitrios Doukas, Thessaloniki (GR); Jyoti Sastry, Cary, NC (US)

(73) Assignee: ABB Schweiz AG (CH)

( * ) Notice: Subject to any disclaimer, the term of this patent is extended or adjusted under 35 U.S.C. 154(b) by 155 days.

(21) Appl. No.: 14/765,079

(22) PCT Filed: Feb. 14, 2013

(86) PCT No.: PCT/EP2013/052967
§ 371 (c)(1),
(2) Date: Jul. 31, 2015

(87) PCT Pub. No.: WO2014/124672
PCT Pub. Date: Aug. 21, 2014

(65) Prior Publication Data
US 2015/0372490 A1    Dec. 24, 2015

(51) Int. Cl.
*H02M 7/42*   (2006.01)
*H02J 3/38*   (2006.01)

(52) U.S. Cl.
CPC .............. *H02J 3/385* (2013.01); *H02M 7/42* (2013.01); *Y02E 10/58* (2013.01); *Y10T 307/549* (2015.04)

(58) Field of Classification Search
CPC ....... H02M 7/42; Y10T 307/549; Y02E 10/58
USPC .......................................................... 307/58
See application file for complete search history.

(56) References Cited

U.S. PATENT DOCUMENTS

| 2010/0288327 | A1 | 11/2010 | Lisi et al. |
| 2011/0160930 | A1 | 6/2011 | Batten et al. |
| 2011/0232714 | A1 | 9/2011 | Bhavaraju et al. |
| 2011/0264288 | A1 | 10/2011 | Khajehoddin et al. |
| 2012/0161526 | A1 | 6/2012 | Huang et al. |
| 2012/0187766 | A1 | 7/2012 | Cleland et al. |

(Continued)

FOREIGN PATENT DOCUMENTS

WO    2010131245 A1    11/2010

OTHER PUBLICATIONS

International Preliminary Report on Patentability Application No. PCT/EP2013/052967 Completed: Jan. 29, 2015 19 pages.

(Continued)

*Primary Examiner* — Robert Deberadinis
(74) *Attorney, Agent, or Firm* — Whitmyer IP Group LLC (57) ABSTRACT

A solar power plant including a power conversion system and a method of controlling the power conversion system. Implemented in a DC/AC inverter, the plant includes photovoltaic modules (PV modules) arranged in arrays connected to a respective DC/DC converters. A power collecting grid interfaces between the DC/DC converters and the DC/AC inverter. The method includes monitoring the performance of each PV array by adjusting the voltage level of each interface between a PV array and the corresponding DC/DC converter, and includes monitoring the output power of each DC/DC converter as a feedback for the regulating.

21 Claims, 7 Drawing Sheets

(56) References Cited

U.S. PATENT DOCUMENTS

2012/0205974 A1    8/2012   McCaslin et al.
2012/0212066 A1    8/2012   Adest et al.
2012/0274139 A1   11/2012   Agamy et al.

OTHER PUBLICATIONS

International Search Report and Written Opinion of the International Searching Authority Application No. PCT/EP2013/052967 Completed: Mar. 22, 2013; Mailing Date: Apr. 3, 2013 11 pages.

METHOD OF CONTROLLING A SOLAR POWER PLANT, A POWER CONVERSION SYSTEM, A DC/AC INVERTER AND A SOLAR POWER PLANT

FIELD OF THE INVENTION

The present disclosure relates to a method, a power conversion system, and a DC/AC inverter for a solar power plant.

BACKGROUND OF THE INVENTION

In a typical solar power plant, solar power are collected by a plurality of photovoltaic (PV) devices or panels transforming the solar power into DC (direct current) electric power, which power is subsequently converted into AC (alternating current) electric power of a power transmission system or grid.

The power is collected at a low voltage by the PV panels, converted into a higher voltage and fed to the transmission system. To provide the conversion a complex system is used incorporating many devices and to maximize efficiency different collecting and conversion systems have been used.

US 2012/0274139 (E1) describes a distributed PV power plant including a plurality of distributed DC/DC converters (22 in E1), each being connected to a plurality of strings of PV panels. The switching of the DC/DC converters is coordinated, and their power are supplied to a common DC bus for further conversion by means of a DC/AC converter into AC power (see FIG. 1-4, claim 1 of E1). By coordinating the switching of the local DC/DC converters a higher efficiency can be provided (see §0032, §0036 in E1).

Another method and system for enhancing efficiency is disclosed in US2011/0160930 (E2). Document E2 describes a solar power plant comprising photovoltaic panels (PV panels) (20 in FIG. 3 of E2), local power converters (22 in E2) and a central power converter (24 in E2). So called maximum power point tracking (MPPT) is provided for each power source, i.e. for each PV panel, by means of the local power converters (22, see §0006, §0021, see also FIG. 4 and FIG. 5 in E2). The central converter (24) also includes MPP tracking (see §0025, claim 1 in E2), and the two methods of MPP tracking are coordinated (see §0061, FIGS. 16-18) in E2. Such a system has benefits during for example shading, but the provision of one dedicated local converter for each panel adds costs to the overall system, especially for larger systems.

SUMMARY OF THE INVENTION

It is an objective of the present disclosure to at least alleviate a problem in the prior art in respect of energy production. An aim of the invention is to provide high efficiency in solar power systems. A further aim is to provide a cost effective system.

For these purposes the present invention provides a method of controlling a solar power plant comprising photovoltaic modules (PV modules) and a power conversion system arranged to convert the power collected by the PV modules for transmission by means of an electric power transmission system. The conversion system comprises a plurality of DC/DC converters, a power collecting grid and a DC/AC inverter, and the PV modules are arranged in arrays of PV modules, each PV array having an interface connected to, and controlled by, a respective one of the DC/DC converters, the power collecting grid being arranged to provide an interface between the plurality of DC/DC converters and an input of the DC/AC inverter (6).

The method comprises monitoring the performance of each PV array and performing a first mode of operation. The first mode of operation comprises a first step of regulating, wherein the voltage level of each interface between a PV array and the corresponding DC/DC converter is adjusted, which regulating is based on a performance model of the PV array and a theoretical efficiency of each DC/DC converter, and includes monitoring the output power of each DC/DC converter during the first step of regulating and use the monitored output power of each DC/DC converter as a feedback for controlling the first regulating step. The first mode of operation also comprises a second step of regulating, wherein the voltage level of the power collecting grid is adjusted, which regulating is based on a theoretical efficiency of the DC/AC inverter, and includes monitoring the output power of the DC/AC inverter, during the second step of regulating and use the monitored output power of the DC/AC inverter as a feedback for controlling the second regulating step.

In an embodiment, the method includes selectively employing the first mode of operation or a second mode of operation. The second mode of operation comprises controlling the voltage level of the power collection grid so that the DC/DC converters provide power at a predefined maximum output voltage to increase the input voltage and power of the DC/AC inverter. In this way an efficient alternative exists when the first mode encounter problems.

In an embodiment, the method includes switching to the second mode of operation when the input voltage, or power, of the DC/AC inverter falls below a first threshold. In this way, the method can function also when, for example, the power production is small and losses in the power conversion grid affect its current transferring capacity.

In an embodiment, the second mode of operation includes controlling the DC/DC converters to perform a maximum power point tracking of each PV array.

In an embodiment, the method includes updating the theoretical efficiency of each primary DC/DC converter and/or updating the theoretical efficiency of the DC/AC inverter. In this way the method adapts to varying conditions of the conversion system, such as losses in different parts of the system due to for example ageing, and failures of components. This provides a step of learning being employed to adapt the functioning automatically to different conditions.

In an embodiment, the method includes converting the power from the PV arrays into DC power at a medium voltage by means of the DC/DC converters. The medium voltage level is between 2 kV and 50 kV. The method includes feeding the medium voltage power to the DC/AC inverter by means of the power collecting grid.

The present invention also provides a power conversion system for a solar power plant, adapted for converting power collected by PV modules of the solar power plant to AC power for transmission by means of an electric power transmission system. The power conversion system comprises a plurality of DC/DC converters, a power collecting grid and a DC/AC inverter. Each DC/DC converter is adapted to be connected to and control an interface to an array of PV modules. Each DC/DC converter may have a plurality of interfaces, each controlling an array of PV modules. The power collecting grid is arranged between the plurality of DC/DC converters and an input of the DC/AC inverter and provides an interface between the DC/DC converters and the DC/AC inverter. The conversion system further comprises at least one control unit arranged and adapted to control the conversion of power. The at least one control unit is adapted to monitor the performance of each PV array, and to perform a first mode of operation comprising a first and a second regulating step. The first step of regulating includes adjusting the voltage level of each interface between a PV array and the corresponding DC/DC converter, The first step of regulating is based on a performance model of the PV array and a theoretical efficiency of each DC/DC converter and includes monitoring the output power of each primary DC/DC converter and uses the monitored output power of each DC/DC converter as a feedback for the first step of regulating. The second step of regulating includes adjusting the voltage level of the power collecting grid. The second step of regulating is based on a theoretical efficiency of the DC/AC inverter and includes monitoring the output power of the DC/AC inverter and uses the monitored output power of the DC/AC inverter as a feedback for the second step of regulating.

In an embodiment, the at least one control unit is adapted to selectively employ the first mode of operation or a second mode of operation. The second mode of operation comprises controlling the DC/AC inverter to adjust its input voltage, so that the DC/DC converters provide the power at a predefined maximum output voltage.

In an embodiment, the at least one control unit is adapted to switch to the second mode of operation when the input power or voltage of the DC/AC inverter falls below a first threshold.

In an embodiment, the second mode of operation comprises controlling the DC/DC converters to perform a maximum power point tracking of each PV array.

In an embodiment, the at least one control unit is adapted to update the performance model of each PV array and/or the theoretical efficiency of each primary DC/DC converter and/or update the theoretical efficiency of the DC/AC inverter.

In an embodiment, each DC/DC converter comprises a control unit, and the at least one control unit is a central control unit that is operatively connected to each control unit of the DC/DC converters and is adapted to control the first step of regulating by instructing each control unit of the DC/DC converters.

In an embodiment the DC/AC inverter comprises a control unit, and the at least one control unit is a central control unit operatively connected to the control unit of the DC/AC inverter and is adapted to control the second step of regulating by means of instructing the control unit of the DC/AC inverter.

In an embodiment the power collecting grid is adapted for collecting DC power at a medium voltage level, such as between 2 kV and 50 kV, and the DC/AC inverter is a medium voltage DC/AC inverter.

In an embodiment each DC/DC converter is an isolated DC/DC converter.

In an embodiment, a power conversion system comprises two power conversion systems as described above. Each of the two power conversion systems provides power by means of its respective DC/AC inverter to the power transmission system.

The present invention also provides a DC/AC inverter for converting medium voltage DC current into medium or high voltage AC current, which DC/AC inverter is also adapted for controlling power conversion of a solar power plant.

The DC/AC inverter controls a solar power plant comprising photovoltaic modules (PV modules) arranged in arrays of PV modules, each PV array (2a-d) being connected to a corresponding one of a plurality of DC/DC converters (4a-d), the DC/DC converters being connected in a power collecting grid to the DC/AC inverter.

Especially, the DC/AC inverter comprises a control unit configured to control the DC/AC inverter. The control unit is configured to be connected to the plurality of the DC/DC converters, the control unit is configured to operatively control each DC/DC converter and operatively control the voltage of each respective interface to respective the PV array by means of the DC/DC converter. The control unit is adapted to monitor the performance of each PV array, and to perform a first mode of operation. The first mode of operation comprises a first step of regulating, wherein the voltage level of each interface between a PV array and the corresponding DC/DC converter is adjusted, which regulating is based on a performance model of the PV array and a theoretical efficiency of each DC/DC converter, and includes monitoring the output power of each primary DC/DC converter during the first step of regulating and using the monitored output power of each DC/DC converter as a feedback for the first step of regulating. The first mode of operating includes a second step of regulating. The second step of regulating includes adjusting the voltage level of the power collecting grid. The second step of regulating is based on a theoretical efficiency of the DC/AC inverter, and includes monitoring the output power of the DC/AC inverter, during the second step of regulating and using the monitored output power of the DC/AC inverter (6) as a feedback for the second step of regulating.

In an embodiment of the DC/AC inverter, the control unit comprises a memory storing a performance model of each PV array, an efficiency model of each DC/DC converter, an efficiency model of the DC/AC inverter, and a model updater configured for updating each model based on measurements of the corresponding unit.

In an embodiment of the DC/AC inverter, the control unit comprises a DC/DC converter regulator configured to control each DC/DC converter in accordance with the first step of regulating, and a DC/AC inverter regulator configured to control the DC/AC inverter in accordance with the second step of regulating.

In an embodiment of the DC/AC inverter, the control unit comprises a mode selector configured to switch between the first mode of operation and a second mode of operation, in which second mode of operation the DC/AC inverter is controlled to set a voltage level of the DC collection grid so that the DC/DC converters provide the output power at a predefined maximum output voltage in order to increase the input power of the DC/AC inverter.

The present invention also provides a solar power plant that comprises a plurality of PV modules arranged and interconnected into a plurality of PV arrays, and a power conversion system of the kind described above, wherein each PV array have an interface connected to, and controlled by, a respective DC/DC converter of the power conversion system.

BRIEF DESCRIPTION OF THE DRAWINGS

The invention is now described, by way of example, with reference to the accompanying drawings, in which.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
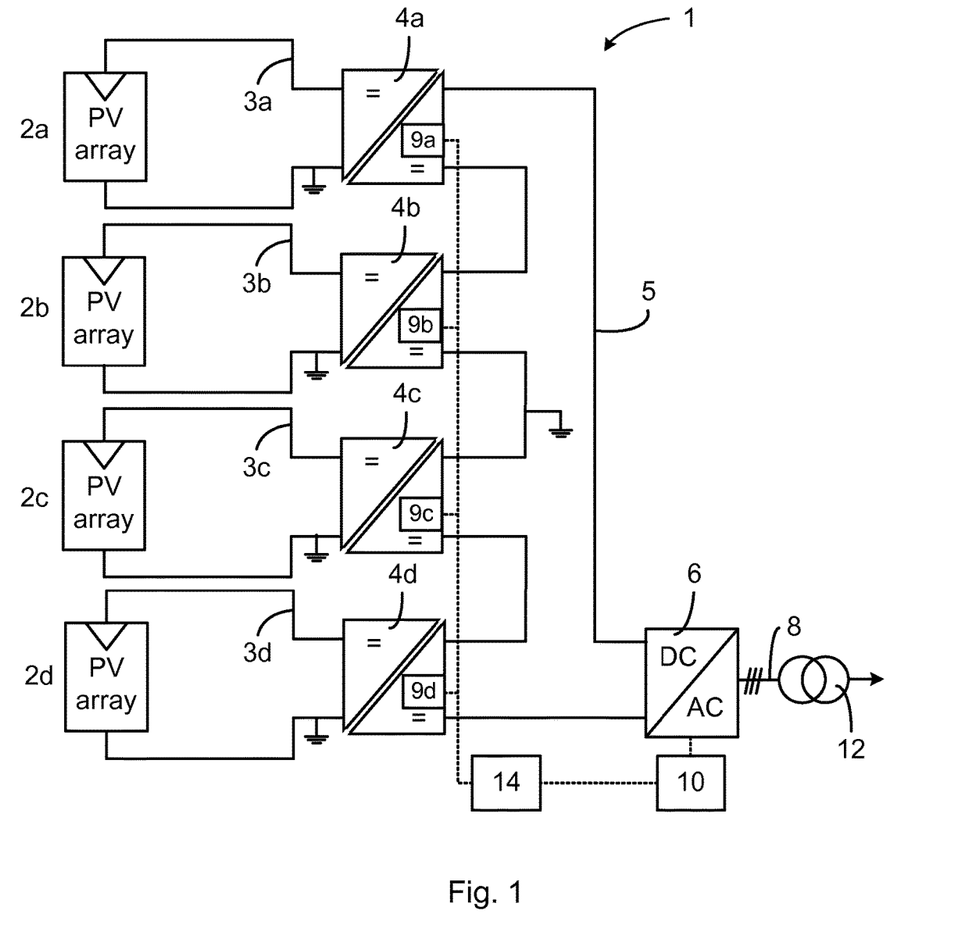
FIG. 1 is a schematic illustration of a first embodiment a solar power plant with high voltage AC connection to a transmission system.

FIG. 1 illustrates a solar power plant 1 comprising a plurality of PV (photovoltaic) arrays 2a, 2b, 2c, 2d, wherein each PV array 2a-d comprises a plurality of interconnected PV panels. Each PV panel consists of one unit comprising interconnected photovoltaic cells. Each PV panel is arranged to receive energy from sun light and transform the energy into electric DC energy. Each PV array should typically include many PV panels, for example hundreds or more than one thousand panels to produce DC power of about 0.5-3 MW. For clarity purposes, the figure do not illustrate the PV panels in each PV array 2a-d, but the number of PV panels in each PV array 2a-d may be between 3000 to 10000 panels, for example 8000 PV panels in 320 parallel lines with 25 PV panels serially connected in each line. The PV panels of each PV array 2a-d are arranged in series and in parallel to produce the electric DC power at an output (3a-d) of about 1000 V, such as up to 1.5 kV. For example, each PV panel produce 250 W and 8000 PV panels produce 2 MW. In this example 320 parallel lines PV panels producing DC electric power at 3.125 V yields a total of 1 kV at the common output (3a-d) of the PV panels of each PV array 2a-d. By the interconnections of the PV panels into an array of PV panels, a first set of DC collection systems are provided, each of these DC collection systems being referred to as a PV array 2a-d.

The solar power plant 1 also comprises a plurality of DC/DC converters 4a, 4b, 4c, 4d adapted for transforming an input DC power having a lower voltage into DC power having a higher voltage, especially a high voltage or medium high voltage. Each DC/DC converter 4a-d has a respective input (3a-d) connected to the output of a respective PV array 2a-d, so that a respective interface 3a-d between each DC/DC converter and each PV array is provided. The outputs of the DC/DC converters 4a-d are serially connected to provide a DC output grid 5 at a medium voltage power level. The total power outputted from the connected DC/DC converters 4a-d are provided to an input of a DC/AC inverter 6. By the interconnection of the DC/DC converters 4a-d to a common output (5) a second DC collection system, grid 5, is provided, at a medium voltage level. The term "medium voltage" refers to voltage levels above 2 kV and below 60 kV, especially voltage levels between 3 kV and 45 kV. Each DC/DC converter 4a-d is an isolated DC/DC converter arranged to provide galvanic isolation between each PV array 2a-d and the medium voltage DC collection grid 5. The system includes arranging the DC/AC inverter 6 to receive the medium voltage DC power from the collection grid 5 by means of its DC input. Thus, each DC/DC converter 4a-d is connected to a respective PV array 2a-d at its input, and the outputs of the DC/DC converters 4a-d are connected in series and provide a medium high voltage DC output connected to the input of the DC/AC inverter 6, so that the second DC collection grid 5 provides an interface between the outputs of the DC/DC converters 4a-d and the DC/AC inverter 6.

The output 8 of the DC/AC inverter provides AC power for subsequent transmission on an AC transmission system (not illustrated), via a transformer 12, which transformer 12 provides galvanic insulation between the power conversion and collection system and the AC transmission system.

Thus, the solar power plant collects solar energy and converts the produced electrical DC power from the PV arrays of low voltage DC power to a high voltage AC power at the output 8 of the medium voltage DC/AC inverter 6 by means of a DC power conversion and collection system 4, 5 and the DC/AC inverter 6. Alternatively the DC/AC inverter 6 is a medium to medium voltage inverter, instead of a medium to high voltage DC/AC inverter 6. This DC power conversion system comprises a set of DC/DC converters 4a-d with a low voltage DC input, and a medium voltage DC arrangement in the form of a medium voltage DC collection grid 5 arranged for feeding DC power of medium voltage to the medium voltage DC/AC inverter 6.

Thus, a low voltage DC input, such as up to 1000 V or 1.5 kV, is converted to a medium voltage collection grid 5, a DC medium voltage of about 3 kV to 45 kV which in turn preferably is converted to a high voltage AC (or alternatively medium voltage AC power) of about 60 kV or more.

Using only two power conversion steps is a means both for reducing costs and reducing power losses during operation.

The solar power plant also includes a number of control units (9a-d, 10, 14) being arranged and adapted for controlling the functioning of the power collection and power conversion. The DC/AC inverter is provided with a controller 10, and each of the DC/DC converters is provided with a respective controller 9a-d. Each controller 9a-d of the DC/DC converters 4a-d is adapted for controlling the conversion of low voltage DC, from each respective array, into the medium voltage DC power that is collected by means of the serial interconnection of the DC collection grid 5 and fed to the DC/AC inverter 6. The DC/AC inverter 6 is provided with a controller 10 adapted for converting medium voltage DC power into AC power of a high, or medium, voltage level in accordance with the AC transmission grid. To provide an efficient overall power conversion system, the power system also includes a central controller 14, which is communicatively connected to each "local" controller 9a-d of each DC/DC converter 4a-d and the controller 10 of the DC/AC inverter 6.

It is possible to omit the central controller 14, and adapt one or more of the controllers 9a-d, 10 of the DC/DC converters 4a-d or the DC/AC inverter 6 to provide the central control functions. However, this is not illustrated in FIG. 1.

The central controller 14 is adapted to obtain, or receive, operating information of each DC/DC converter 4a-d and the DC/AC inverter 6, which operating information is obtained at the respective inputs and outputs of the converters 4a-d and inverter 6. The Controller 14 is adapted to use the measurements and operating information provided from the local control units 9, 10 to perform an overall system control to obtain an overall power efficient operation of the whole power conversion system and the solar power plant.

The central control functions will be described in more detail with reference to FIGS. 2-7, and a central controller 14 is suggested for adapting the conversion system to function in accordance with the methods of the exemplifying embodiments of the invention. FIG. 7 suggests implementing the central control functions in the control unit 10 of the DC/AC inverter 6.

Figure 2A:
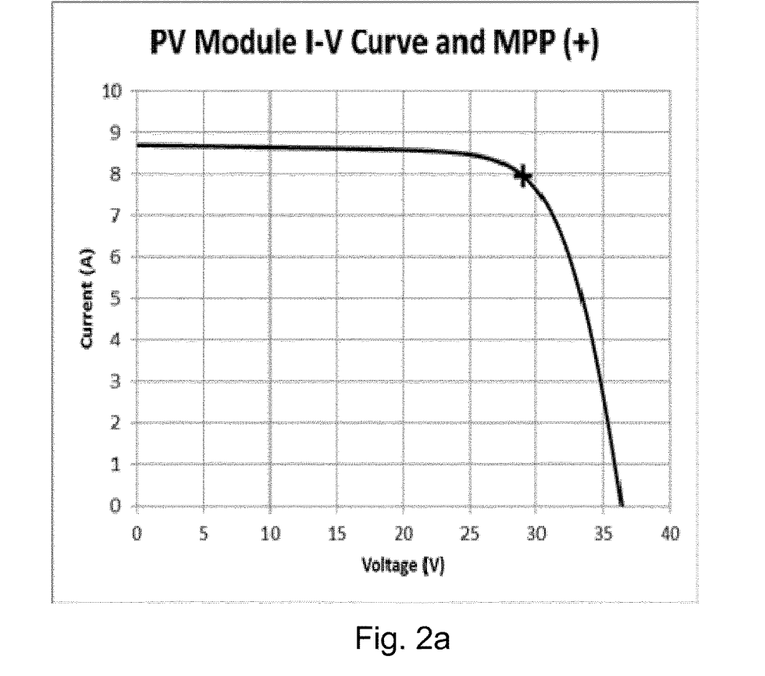
FIG. 2a, 2b, 2c are graphs illustrating the maximum power point of a PV panel.
Figure 2B:
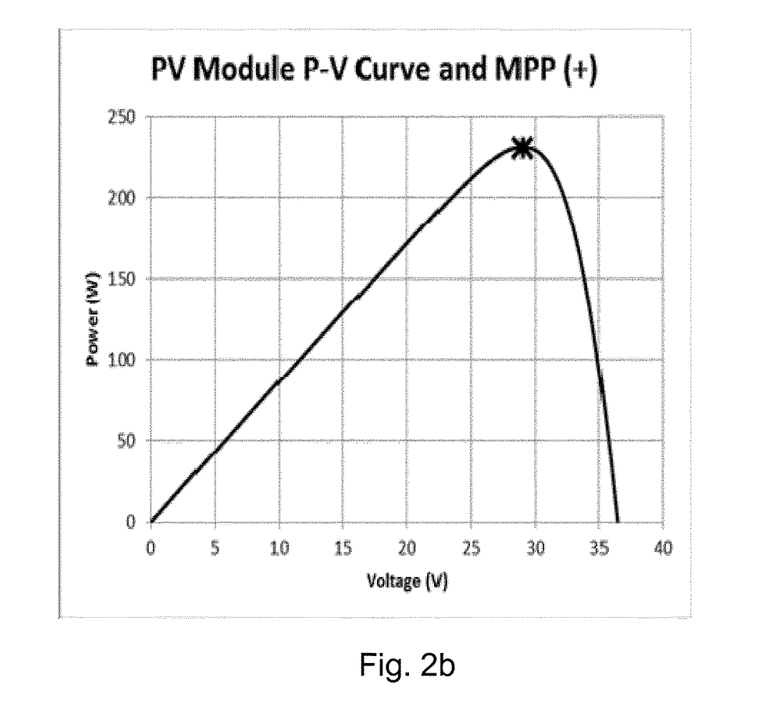
Figure 2C:
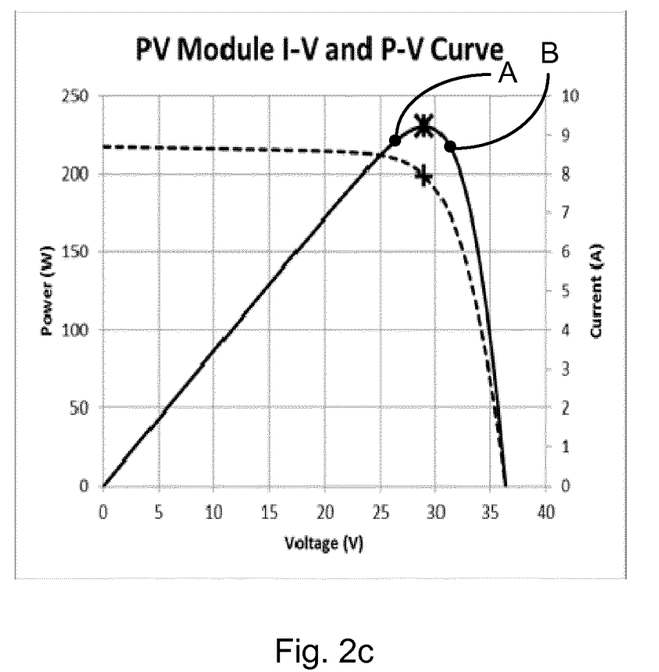

FIGS. 2a-c illustrates the maximum power point of a PV panel or PV module. These figures illustrate the relationship between the voltage of a PV module and the current and power of the PV module. The invention suggests controlling a PV array, i.e. arrays 2a-d of PV modules connected in series and parallel. The control of such a PV array 2a-d can utilise corresponding relationships for a PV array 2a-d of PV modules, which array relationships are determined by summarizing the relationships of the PV modules of the PV array 2a-d. The relationship so obtained provides a description, or model, of the performance of the PV array 2a-d at varying voltage and power levels. FIG. 2a is a current-voltage curve that illustrates how the current fed from a PV module varies with a voltage applied to the output of the PV module. FIG. 2b is a power-voltage curve and illustrates how the power from the PV module varies with the applied voltage. FIG. 2c illustrates both the current-voltage and the power-voltage curves. The point where the transferred power has a maximum is indicated in each curve. This is the maximum power point and for each state of the PV module the maximum power point can be tracked to provide the maximum power output of that state. However, tracking the maximum power output of the PV module may not lead to the maximum power output of a total conversion system or a whole solar power plant.

The conversion system of a solar power plant should be dimensioned to transfer as much power as possible to the power transmission system or power grid. Also the efficiency of the power conversion system of the solar power plant varies with different voltages and power levels. The power conversion system may therefore operate in a non-optimal state even if the PV modules operate at the maximum power point. The invention provides systems and methods for matching the efficiency of the PV modules and the conversion system to reach an overall maximum power transfer from the PV modules to the power transmission grid.

FIG. 2c also indicate operating points, A and B, of a PV module, which operating points A, B, differ from the maximum power point (MPP) of the PV module. When tracking the MPP, voltage levels (such as A and B) that for the current state differs from the MPP are adjusted to match the MPP. However, the embodiments of the present invention considers the total efficiency of the conversion system and may therefore regulate one or more of the PV arrays 2a-d to operate at an operating point A, B that differ from the MPP.

Figure 3:
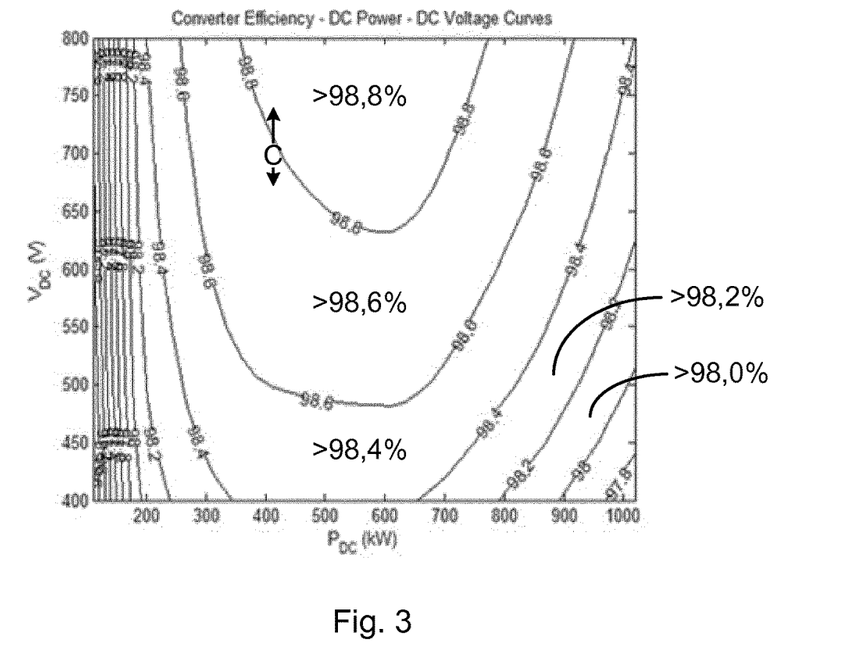
FIG. 3 is an illustration of a DC/DC converter efficiency contour.
Figure 4:
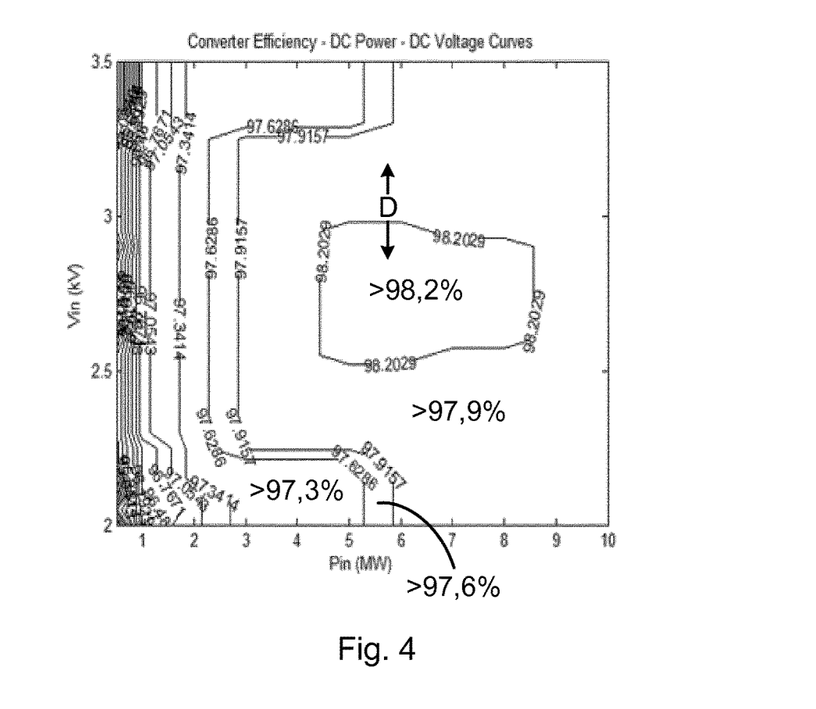
FIG. 4 is an illustration of a medium voltage DC/AC inverter efficiency contour.

FIG. 3 and FIG. 4 illustrates the efficiencies of the DC/DC converters and the DC/AC inverter of the system of FIG. 1. The FIGS. 3 and 4 illustrate efficiency levels for different power levels and input voltages, and indicate the efficiency levels as areas within each diagram. As can be seen from FIG. 3, the DC/DC converter is dimensioned to provide the highest efficiency at 800 V. As can be seen from FIG. 4, the DC/AC inverter is dimensioned to provide the best efficiency for about 2.75 kV. In accordance with the embodiments of the invention, the voltage of the PV modules 2a-d (in FIG. 1) which is the input voltage of the DC/DC converter 4a-d (in FIG. 1), should be matched to provide the best power transfer through the DC/DC converter 4a-d. From FIGS. 2a-c it is apparent that raising the voltage decrease the current from the PV modules and for voltages above the maximum power point voltage, a voltage increase leads to a power decrease. From FIG. 3 it can be seen that for operating points at voltages lower than 800 V, raising the voltage also provides the best efficiency in general for the DC/DC converter. Thus, an increase in voltage for the DC/DC converter, to increase its efficiency should be made in view of the fact that the voltage increase may lead to a decreasing power being fed from the PV modules of the PV array. Returning to FIG. 2c, operating point A illustrates a situation or state where the voltage is below the voltage of the MPP. Operating point B, on the other hand, illustrates a situation where the voltage level is above the voltage level of the MPP.

The embodiments of the invention employs both a performance model of each PV array 2a-d, such as the power and voltage relationship of FIG. 2c, and a theoretical efficiency, model, as in FIG. 3, of each DC/DC converter 4a-d when regulating the interface between each DC/DC converter 4a-d and each PV array 2a-d.

The embodiment of FIG. 3 illustrates an operating point of a PV array 2a-d, which operating point C is indicated in, or mapped into, the efficiency diagram of the DC/DC converter 4a-d. The embodiments of the invention consider regulating the conversion system, in this case the DC/DC converter, to raise the efficiency of the DC/DC converter, by moving such an operating point C. The embodiments therefore monitor the interface between different devices of the system, such as between the PV array 2a-d and the DC/DC converters 4a-d and regulates the voltage of the interface in view of both devices. Thus, this regulation may suitably be made considering also the voltage and power relationship, or performance model, of the PV array 2a-d in question. The conversion system is adapted to monitor the power output from the DC/DC converter 4a-d while adjusting the operating point of the interface of the PV array 2a-d, which adjustment is based on considering the performance model, determined by the voltage and power relationship, of the PV array and the theoretical efficiency, illustrated in FIG. 3, of the DC/DC converter. Thus, the conversion system is adapted to provide each regulation of the operating point of the PV array 2a-d either in sequence, for example first regulating based on the power voltage relationship of the PV array 2a-d followed by a regulation of the operating point C based on the voltage and power relationship of the DC/DC converter 4a-d, or preferably in combination, wherein the regulation is based on a theoretically determined mapping of the performance model, or voltage and power relationship, of the PV array onto the theoretical efficiency, or the power and voltage relationship, of the DC/DC converter.

It should be noted that the efficiencies described in FIGS. 3 and 4 of the relationship of the voltage and power of the DC/DC converter and DC/AC inverter is a theoretical model, which however may be provided by measurements, and the described embodiments includes a regular update of these theoretical models by means of measurements performed in the conversion system. The theoretical models of the efficiencies may, in accordance with these embodiments, be defined in the conversion system during installation and be subsequently updated during operation.

FIG. 4 illustrate the efficiency of the DC/AC inverter 6, wherein the diagram illustrates the relationship between different DC input voltages and the power. The output voltage, such as at a high voltage, is determined by the transmission grid or transmission link to which the output of the DC/AC inverter 6 is connected. An operating point D is illustrated in the diagram, which corresponds to a voltage level and power level being received at the input of the DC/AC inverter 6 by means of the interface defined by the DC collection grid 5. The conversion system of the embodiments is adapted to regulate the operating point D to provide an enhanced efficiency, which regulation is based on the theoretical efficiency, or relationship, between the input voltage and power of the DC/AC inverter 6, as illustrated in FIG. 4.

Accordingly, the system is adapted to perform an adjustment of the input voltage of the DC/AC inverter 6 to enhance the efficiency. The input voltage may be adjusted by means of the central controller 14 instructing each local control unit 9a-d of each DC/DC converter 4a-d to adapt their respective output voltage to provide the determined input voltage in accordance with the adjustment of the DC/AC inverter 6.

The embodiments of the invention disclose a regulation for enhancing the efficiency of the power conversion that is carried out in two steps. A first step is performed, wherein the output power of each PV array 2a-d is regulated by the corresponding DC/DC converter 4a-d on the basis of the monitored performance of the PV array 2a-d, the performance model of the array 2a-d and the theoretical efficiency of the DC/DC converter 4a-d. A second step is performed, wherein the input power of the DC/AC converter 6 is regulated in cooperation by all the DC/DC converters 4a-d connected to the input of the DC/AC inverter 6, and which regulation is based on the theoretical efficiency model of the DC/AC inverter 6. In the first step, the output power of the DC/DC converter is monitored during the regulation. In the second step, the output power of the DC/AC inverter is monitored during the regulation. In this way the system can track a maximum efficiency by adjusting the operating points of all the interfaces in the system.

A straightforward implementation of the first step is to regulate the input voltage at the input terminals of each DC/DC converter 4a-d, which correspond to the voltage of the PV array 2a-d, in accordance with a theoretical model of the relationship between the voltage and power of the combination of the PV array 2a-d and the (respective) DC/DC converter 4a-d of the PV array 2a-d. A straightforward implementation of the second step is to regulate the input voltage of the DC/AC inverter 6 based on the theoretical efficiency of the DC/AC inverter 6, which regulation is performed by means of the DC/AC inverter adjusting the voltage level of the DC collection grid 5 so that the output voltage of each DC/DC converters 4a-d is regulated to achieve a suitable total voltage input as fed through the collection grid 5 to the DC/AC inverter 6.

Figure 5:
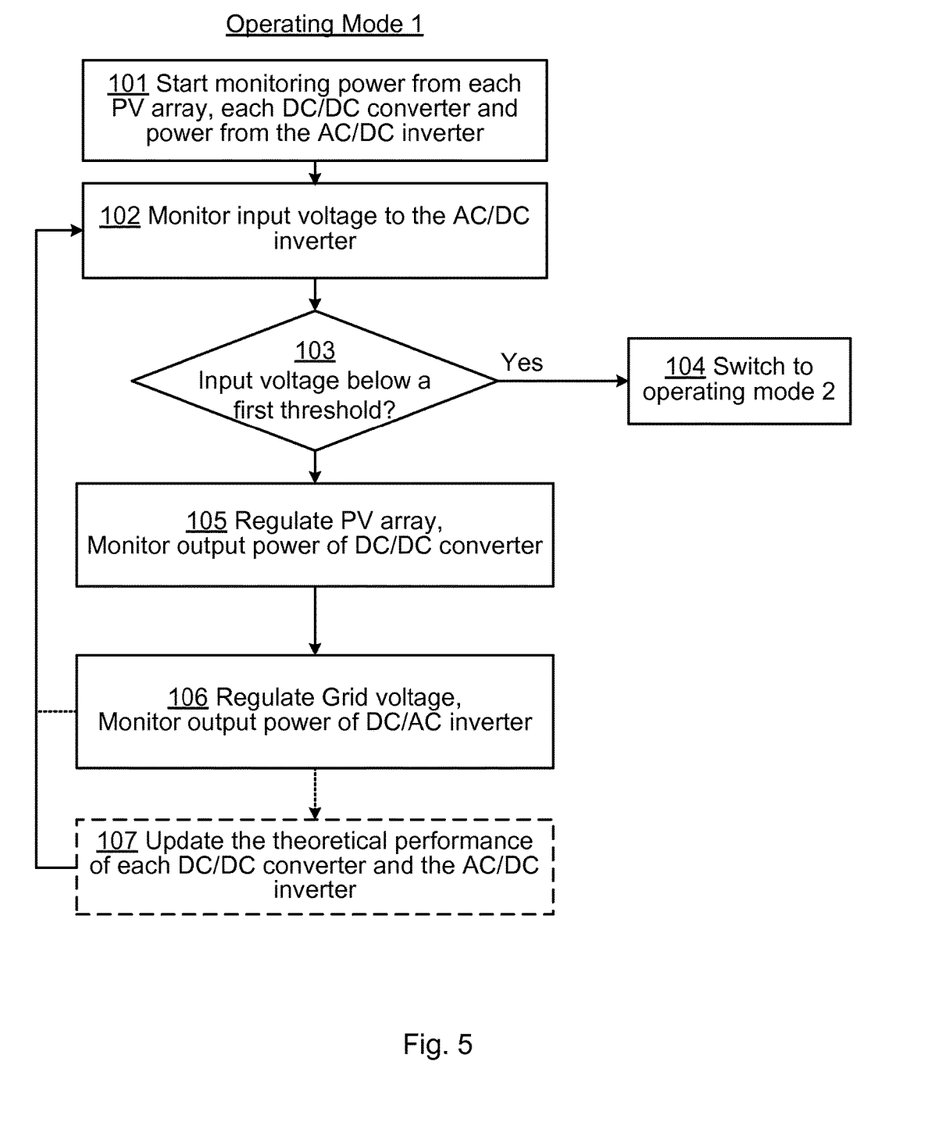
FIG. 5 is a schematic illustration of an operating method according to an embodiment of the invention.
Figure 6:
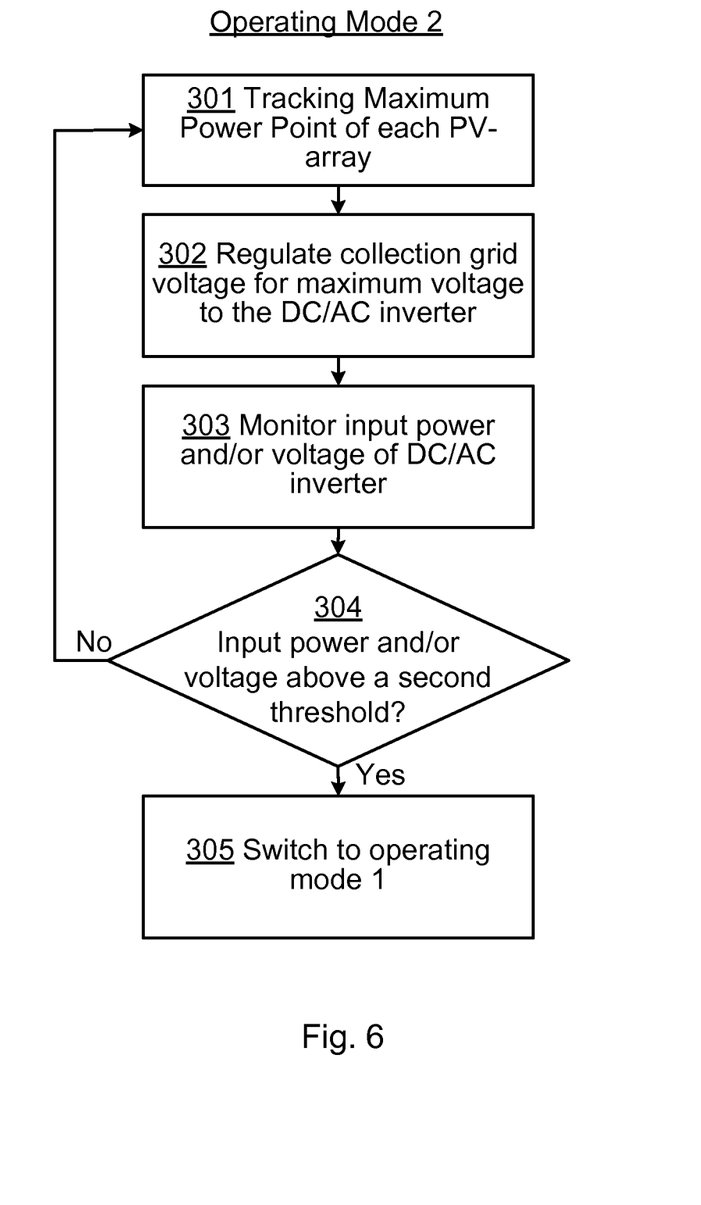
FIG. 6 is a schematic further illustration of an operating method according to an embodiment of the invention.
Figure 7:
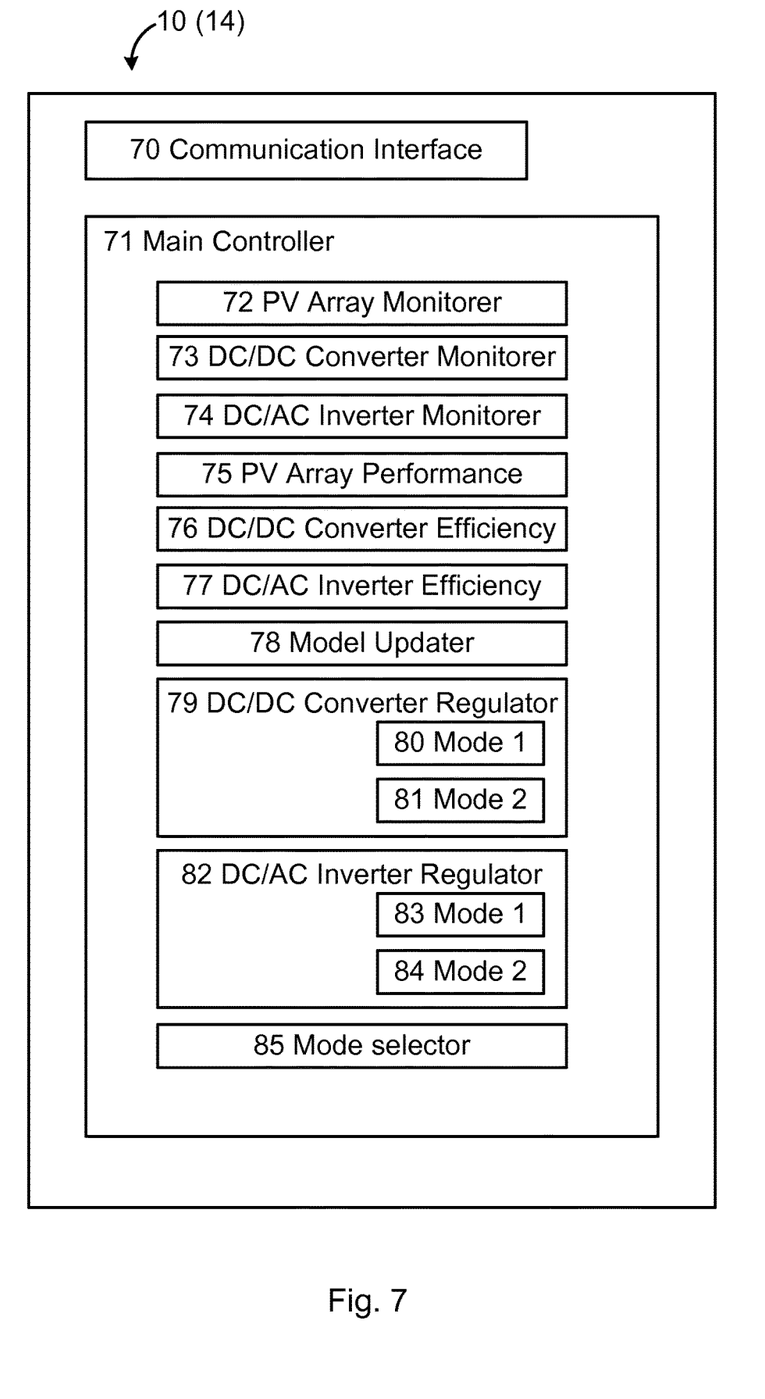
FIG. 7 is a schematic illustration of an embodiment of a controller for a DC/AC inverter in accordance with the invention.

FIGS. 5 and 6 illustrates an embodiment of power conversion in accordance with the invention. This embodiment includes two different modes of operation. The first operating mode is illustrated in FIG. 5, and the second operating mode id illustrated in FIG. 6.

The first operating mode (operating mode 1) illustrated in FIG. 5 describes the two steps of regulating the power conversion for increasing efficiency as mentioned above. Operating mode 1 includes a step of considering switching to the second mode of operation, operating mode 2, which is illustrated in FIG. 6.

Operating mode 1 starts with monitoring 101 the power from each PV array 2a-d, the power through each DC/DC converter 4a-d fed by means of the collection grid 5 and the power outputted from the DC/AC inverter 6.

Mode 1 also includes monitoring the input voltage at the input terminals of the DC/AC inverter 6. This monitoring is made to determine if a switch to operating mode 2 should be done. Thus, operating mode 1 continues with determining if the input voltage is too low, i.e. below a first threshold level.

The threshold level is set to discover when power losses of the power collecting grid 5 becomes too large, and in such a case switch to the second operating mode 2 for better efficiency.

Thus, if the voltage level is too low, the system is adapted to switch to operating mode 2, step 104, in accordance with operating mode 1.

If the voltage level is satisfactory, operating mode 1 continues with two steps of regulating. In the first step 105, the interface 3a-d between each PV array 2a-d and each respective DC/DC converter 4a-d is regulated by adjusting the voltage of the interface. Thus the operating voltage of each PV array 2a-d is controlled. According to step 105, the voltage level is adjusted based on a performance model of the PV array 2a-d and a theoretical efficiency model of each respective DC/DC converter 4a-d, and the regulation step 105 is performed in accordance with the performance models of both the PV array 2a-d in question and of the theoretical efficiency of the corresponding DC/DC converter 4a-d. Especially, the theoretical models, or their combination, are used to determine whether the voltage should be increased or decreased.

The regulation step 105 of the operating point of the interface 3a-d includes evaluating the regulating by monitoring the output power of the respective DC/DC converter 4a-d to determine if the new operating point is better. Thus, in view of the variations of the output power of each DC/DC converter 4a-d the successfulness of varying the voltage is determined. This is performed by providing the monitored output power of each DC/DC converter 4a-d as a feedback when adjusting the voltage of the respective interfaces 3a-d of each PV array 2a-d. An increase in output power is considered a successful regulation and the new operating point is maintained. A decrease in the output power, when moving to a new operating point, is considered an unsuccessful regulation and the decrease in power is counteracted by a return to the previous operating point.

In step 106 the operating point of the interface 5 between the output of all the DC/DC converters 4a-d and the input of the DC/AC inverter 6 is regulated. This regulation step 106 is based on the theoretical performance of the DC/AC inverter 6. Regulating step 106 includes evaluating the regulation of the operating point of the interface between the DC/DC converters 4a-d and the DC/AC inverter 6 by monitoring the output power of the DC/AC inverter 6. A feedback of the monitored output power and/or its variation is provided in the regulation step 106. Thus, the regulation is adjusted on the basis of the output power from the DC/AC inverter 6.

Operating mode 1, of FIG. 5, includes an optional step of updating the theoretical models of the performances of each PV array 2a-d, of the efficiencies of each DC/DC converter 4a-d and of the efficiency of the DC/AC inverter 6. This is done by means of the measurements in the system such as including measurements of the voltages and currents of each PV array 2a-d output, such as measured at the corresponding DC/DC converter input 4a-d, each DC/DC converter 4a-d input and output and the input and output of the DC/AC inverter 6.

FIG. 6 illustrates operating mode 2, which is used when the input voltage, or power, of the DC/AC inverter 6 falls below a threshold that can be interpreted as corresponding to a too small power from the PV arrays 2a-d in relation to power losses of the conversion system so that a tracking of a maximum power point of the total conversion system cannot be performed. Alternatively, or additionally, the power or current is monitored. During low power levels, as obtained at the PV arrays 2a-d, a successful tracking of a search for a maximum efficiency may not be suitable. In accordance with the embodiment of FIG. 5, the method of operation may then switch to an operating mode 2 of keeping the input voltage of the DC/AC inverter 6 at a high level to keep down the power losses of the DC collection grid 5.

Operating mode 2 suitably starts with tracking the maximum power points of each PV array 2a-d to provide a maximum input power into the conversion system. In step 302 the DC/DC converters 4a-d are regulated for providing a predefined maximum voltage input at the DC/AC inverter 6. The input voltage of the DC/AC inverter 6 is monitored, in step 303, and operating mode 2 is continued until the operating point of power and input voltage of the DC/AC inverter 6 reaches above a second threshold in which case the operation of the conversion system returns to operating mode 1. Thus operating mode 2 includes a step 304 of determining if the power and/or input voltage are/is above a second threshold, in which case the operating mode 2 continues with step 305. If the input voltage is determined as still being lower than the second threshold, the operating mode 2 continues by returning to the step 301 of tracking the maximum power point of each PV array 2a-d followed by the step of regulating 302 the DC/DC converters 4a-d to increase the power and/or input voltage of the DC/AC inverter 6. However, if the power or voltage is determined in step 304 to having reach above the second threshold, operating mode 2 continues with a step 305 of switching to operating mode 1.

Both the operating modes may suitably be performed by means of the central controller 14 communicatively and operatively connected to each local control unit 9a-d, 10 and which controller 14 may be adapted to perform the method steps by instructing each respective control unit 9a-d, 10 to provide measurements and perform the control of each respective device, i.e. each respective DC/DC converter or the DC/AC inverter, in accordance with the described methods.

FIG. 7 illustrates an embodiment wherein a control unit 10 of a DC/AC inverter 6 provides a central control of the power conversion system. A central control unit 14 may then be omitted. FIG. 7 provides an illustration of the main functions of the embodiment when the invention is implemented, but has been simplified and do not illustrate the basic functions of a DC/AC inverter for providing the power conversion from DC to AC as such. These functions can suitably be implemented as software that when executed in the DC/AC inverter control unit 10 controls the control unit 10 to control the DC/AC inverter to provide the functions in the disclosed method.

The control unit 10 of the DC/AC inverter comprises a communication interface 70 for communicating and operatively controlling the DC/AC inverter 6 and the DC/DC converters 4a-d as well as receiving measurements from the inputs and outputs of each DC/DC converter 4a-d and the DC/AC inverter 6. The control unit 10 includes a main controller 71, such as a computer with processor and memory, for effectuating the specific functions. The main controller 71 includes a PV array monitorer 72, a DC/DC converter monitorer 73 and a DC/AC inverter monitorer 74 so that the control unit 10 is configured to monitor the voltages and currents (or voltages and powers) of each respective device, i.e. each PV array 2a-d, each DC/DC converter 4a-d, and the DC/AC inverter 6. The main controller 71 is also configured with a number of theoretical models and configured to use the models for performing the regulating steps; i.e. a PV array performance model 75, a DC/DC converter efficiency model 76 and a DC/AC inverter efficiency model 77. As described in relation to the method, these theoretical models should be updated during operation, and for this purpose, the main controller 71 comprises a model updater 78, provided to update each model 75, 76, 77 in view of the measurements provided by the monitoring elements 72, 73, 74.

The main controller also includes two regulators 79, 82, each having two modes of operation; mode 1 and mode 2, respectively, which modes are selected by means of a mode selector 85. The first regulator is a DC/DC converter regulator 82 configured to control each of the DC/DC converters 4a-d in accordance with the method of the invention, operating according to mode 1 and mode 2.

Thus, the DC/DC converter regulator 79 is configured to use, in mode 1, the voltages and currents of each PV array 2a-d as provided by means of the PV array monitorer 72 to regulate each DC/DC converter 4a-d. The DC/DC converter regulator 79 is also configured to use the performance model 75 of each PV array 2a-d and the efficiency model 76 of each DC/DC converter 4a-d, to regulate the voltage of the interface between each PV array 2a-d and each DC/DC converter 4a-d by means of using the output voltage of each DC/DC converter 4a-d as feedback, which output voltage is provided by means of the DC/DC converter monitorer 73.

The DC/DC converter regulator 79 is configured to use, in mode 2, the voltages and currents of each PV array 2a-d as provided by the PV monitorer 72 together with the performance model of the PV array 75 to perform a maximum power point tracking of each PV array 2a-d.

To lessen the losses of the collection grid 5 and keep the input voltage and power of the DC/AC inverter 6 at a high level, the DC/AC inverter 6 is controlled by the DC/AC inverter regulator 82 to set the collection grid 5 voltage at a predefined maximum level, in mode 2.

In mode 1, the DC/AC inverter regulator 82 is configured to regulate the voltage of the conversion grid 5, or input of the DC/AC inverter 6 on the bases of the theoretical efficiency model 77 of the DC/AC inverter 6, while using the monitored output voltage, as provided by the DC/AC monitorer 74, as a feedback for the regulation. Thus, the DC/AC inverter regulator is configured to monitor the input in view of the theoretical efficiency model 77, or differently described, to map the input operating point of the conversion grid 5 on the efficiency model 77 of the DC/AC inverter 6, and using the monitored output of the DC/AC inverter, as monitored by means of the DC/AC inverter monitorer 76, as a feedback for the regulation.

The main controller 71 may also suitably include means for monitoring or receiving information of the transmission grid, such as reactive power, and may provide compensation of reactive power, or provide filtering functions, in the transmission grid; however such functioning is not described in this disclosure.

The main controller 71 also includes a mode selector 85 configured for providing the switching between operating mode 1 and operating mode 2. The mode selector being configured to use input voltage and current/power of the DC/AC inverter 6, as obtained by the DC/AC inverter monitorer 74, for selecting operating mode based on a criteria, such as a threshold level for the input voltage, and/or current and/or power.

Also, FIG. 7 illustrates the alternative embodiment of the central control functions that a central control unit 14 should perform to when regulating the power conversion system. In such a system the central control unit 14 controls the DC/AC inverter via its "local" control unit 10.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling a solar power plant comprising photovoltaic modules (PV modules) and a power conversion system arranged to convert the power collected by the PV modules for transmission by means of an electric power transmission system, the conversion system comprises a plurality of DC/DC converters, a power collecting grid and a DC/AC inverter, and wherein the PV modules are arranged in arrays of PV modules, each PV array having an interface connected to, and controlled by, a respective one of the DC/DC converters, the power collecting grid being arranged to provide an interface between the plurality of DC/DC converters and an input of the DC/AC inverter the method comprising monitoring the performance of each PV array, and
a first mode of operation comprising:
a first step of regulating, wherein the voltage level of each interface between a PV array and the corresponding DC/DC converter is adjusted, which regulating is based on a performance model of the PV array and an efficiency model of each DC/DC converter, which efficiency model describes the relationship between the voltage and the power of the respective DC/DC converter, and which regulating includes monitoring the output power of each DC/DC converter during the first step of regulating and using the monitored output power of each DC/DC converter as a feedback for adjusting the voltage level of each interface between PV array and corresponding DC/DC converter,
a second step of regulating, wherein the voltage level of the power collecting grid, is adjusted, which regulating is based on an efficiency model of the DC/AC inverter, which efficiency model describes the relationship between the voltage and the power of the respective DC/AC converter and which regulating includes monitoring the output power of the DC/AC inverter, during the second step of regulating and using the monitored output power of the DC/AC inverter as a feedback for adjusting the voltage level of the power collecting grid.

2. The method of controlling a solar power plant according to claim 1, including selectively employing the first mode of operation or a second mode of operation, the second mode of operation comprising controlling the voltage level of the power collection grid so that the DC/DC converters provide power at a predefined maximum output voltage to increase the input voltage of the DC/AC inverter.

3. The method of controlling a solar power plant according to claim 2, the method includes switching to the second mode of operation when the input voltage of the DC/AC inverter falls below a first threshold.

4. The method of controlling a solar power plant according to claim 3, the second mode of operation comprising controlling the DC/DC converters to perform a maximum power point tracking of each PV array.

5. The method of controlling a solar power plant according to claim 1, including updating the performance model of each PV array, updating the efficiency model of each primary DC/DC converter and/or updating the efficiency model of the DC/AC inverter based on the monitoring of the corresponding unit.

6. The method of controlling a solar power plant according to claim 1, including converting, by means of the DC/DC converters, the power from the PV arrays into DC power at a medium voltage, such as between 2 kV and 50 kV and feeding the power at the medium voltage level to the DC/AC inverter by means of the power collecting grid.

7. A DC/AC inverter for converting medium voltage DC current into medium or high voltage AC current, the DC/AC inverter being adapted for controlling power conversion of a solar power plant, in which solar power plant photovoltaic modules (PV modules) are arranged in arrays of PV modules, each PV array being connected to a corresponding one of a plurality of DC/DC converters, the DC/DC converters being connected in a power collecting grid to the DC/AC inverter, said DC/AC inverter comprises a control unit configured to control the DC/AC inverter, the control unit being configured to be connected to the plurality of the DC/DC converters, the control unit being operative to control each DC/DC converter and operative to control the voltage of the respective interface to the respective PV array by means of the DC/DC converter, the control unit being adapted
to monitor the performance of each PV array, and
to perform a first mode of operation comprising:
a first step of regulating, wherein the voltage level of each interface between a PV array and the corresponding DC/DC converter is adjusted, which regulating is based on a performance model of the PV array and an efficiency model of each DC/DC converter, which efficiency model describes the relationship between the voltage and the power of the respective DC/DC converter, and which regulating includes monitoring the output power of each primary DC/DC converter during the first step of regulating and using the monitored output power of each DC/DC converter as a feedback for adjusting the voltage level of each interface between PV array and corresponding DC/DC converter, and
a second step of regulating, wherein the voltage level of the power collecting grid, is adjusted, which regulating is based on an efficiency model of the DC/AC inverter, which efficiency model describes the relationship between the voltage and the power of the respective DC/AC converter and which regulating includes monitoring the output power of the DC/AC inverter, during the second step of regulating and using the monitored output power of the DC/AC inverter as a feedback for adjusting the voltage level of the power collecting grid.

8. The DC/AC inverter according to claim 7, the control unit comprising a memory storing a performance model of each PV array, an efficiency model of each DC/DC converter, an efficiency model of the DC/AC inverter, and a model updater configured for updating each model based on measurements of the corresponding unit.

9. The DC/AC inverter according to claim 7, the control unit comprising a DC/DC converter regulator configured to control each DC/DC converter in accordance with the first step of regulating, and a DC/AC inverter regulator configured to control the DC/AC inverter in accordance with the second step of regulating.

10. The DC/AC inverter according to claim 9, the control unit comprising a mode selector configured to switch between the first mode of operation and a second mode of operation, in which second mode of operation the voltage level of the power collection grid is controlled to provide a predefined maximum operating voltage to increase the input power of the DC/AC inverter.

11. A power conversion system for a solar power plant, adapted for converting power collected by PV modules of the solar power plant to AC power for transmission by means of an electric power transmission system, the power conversion system comprising:

a plurality of DC/DC converters, a power collecting grid and a DC/AC inverter, and wherein each DC/DC converter is adapted to be connected to and control an interface of an array of PV modules, the power collecting grid being arranged between the plurality of DC/DC converters and an input of the DC/AC inverter providing an interface between the DC/DC converters and the DC/AC inverter, the conversion system further comprises at least one control unit being arranged and adapted to control the conversion of power, the at least one control unit being adapted to monitor the performance of each PV array and
to perform a first mode of operation comprising:

a first step of regulating, wherein the voltage level of each interface between a PV array and the corresponding DC/DC converter is adjusted, which regulating is based on a performance model of the PV array and an efficiency model of each DC/DC converter, which efficiency model describes the relationship between the voltage and the power of the respective DC/DC converter, and which regulating includes monitoring the output power of each DC/DC converter during the first step of regulating and using the monitored output power of each DC/DC converter as a feedback for adjusting the voltage level of each interface between PV array and corresponding DC/DC converter, and a second step of regulating, wherein the voltage level of the power collecting grid, is adjusted, which regulating is based on an efficiency model of the DC/AC inverter, which efficiency model describes the relationship between the voltage and the power of the respective DC/AC converter and which regulating includes monitoring the output power of the DC/AC inverter, during the second step of regulating and using the monitored output power of the DC/AC inverter as a feedback for the second step of regulating.

12. The power conversion system according to claim 11, the at least one control unit being adapted to selectively employ the first mode of operation or a second mode of operation, the second mode of operation comprising controlling the voltage level of the DC collection grid to provide a predefined maximum operating voltage.

13. The power conversion system according to claim 12, the at least one control unit being adapted to switch to the second mode of operation when the input power or input voltage of the DC/AC inverter falls below a first threshold.

14. The power conversion system according to claim 13, the second mode of operation comprising controlling the DC/DC converters to perform a maximum power point tracking of each PV array.

15. The power conversion system according to claim 11, the at least one control unit being adapted to update the performance model of each PV array, the theoretical efficiency of each DC/DC converter and/or update the theoretical efficiency of the DC/AC inverter.

16. The power conversion system according to claim 11, wherein each DC/DC converter comprises a control unit, and the at least one control unit being a central controller operatively connected to each control unit of the DC/DC converters and being adapted to control the first step of regulating by means of instructing each control unit of the DC/DC converters.

17. The power conversion system according to claim 11, wherein the DC/AC inverter comprises a control unit, and the at least one control unit being a central controller operatively connected to the control unit of the DC/AC inverter and being adapted to control the second step of regulating by means of instructing the control unit of the DC/AC inverter.

18. The power conversion system according to claim 11, the power collecting grid being adapted for collecting DC power at a medium voltage level, such as between 2 kV and 50 kV, and the DC/AC inverter being a medium voltage DC/AC inverter.

19. The power conversion system according to claim 11, each DC/DC converter being an isolated DC/DC converter.

20. The power conversion system according to claim 11, comprising a further set of DC/DC converters, a further power collecting grid and a further DC/AC inverter, the further set of PV arrays, DC/DC converters, power collecting grid and DC/AC inverter being provided in a further power conversion system, adapted for converting power collected by a further set of PV modules of the solar power plant to AC power for transmission by means of the electric power transmission system, the further power conversion system being arranged and controlled to provide two power conversion systems providing power to the electric power transmission system, where each of the two power conversion systems provide power by means of its respective DC/AC inverter.

21. A solar power plant comprising a plurality of PV modules being arranged and interconnected into a plurality of PV arrays of PV modules, and at least one power conversion system according to claim 11, wherein each PV array has an interface being connected to, and controlled by, a respective DC/DC converter of the at least one power conversion system.

* * * * *